United States Patent
Cadden et al.

(10) Patent No.: US 6,528,123 B1
(45) Date of Patent: Mar. 4, 2003

(54) COATING SYSTEM TO PERMIT DIRECT BRAZING OF CERAMICS

(75) Inventors: Charles H. Cadden, Danville, CA (US); F. Michael Hosking, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/607,314

(22) Filed: Jun. 28, 2000

(51) Int. Cl.[7] .............................. B05D 3/02; B05D 1/36; C23C 14/00
(52) U.S. Cl. ................. 427/404; 427/376.2; 427/376.3; 427/376.6; 427/376.7; 427/383.1; 427/383.3; 427/383.5; 427/383.7; 427/405; 427/419.1; 427/419.2; 427/250
(58) Field of Search .......................... 427/376.2, 376.3, 427/376.6, 376.7, 383.1, 383.3, 383.5, 383.7, 404, 405, 419.1, 419.2, 250

(56) References Cited

U.S. PATENT DOCUMENTS

| | | | | |
|---|---|---|---|---|
| 3,993,411 | A | | 11/1976 | Babcock et al. ............ 403/271 |
| 4,542,073 | A | | 9/1985 | Tanaka et al. ............... 428/446 |
| 4,917,642 | A | * | 4/1990 | Nakahashi et al. ........... 445/44 |
| 5,240,171 | A | | 8/1993 | Newkirk et al. ............. 228/198 |
| 5,364,010 | A | * | 11/1994 | Mizuhara .................. 228/124.6 |
| 5,385,791 | A | | 1/1995 | Mizuhara et al. ........... 428/621 |
| 6,315,188 | B1 | * | 11/2001 | Cadden et al. ............. 228/122.1 |

OTHER PUBLICATIONS

H. Mizuhara and K. Mally, *Ceramic–to–Metal Joining with Active Brazing Filler Metal*, Welding Journal, Paper presented at the 16th International AWS Brazing Conference, held Apr. 30 to May 2, 1985, in Las Vegas, NV pp. 27–32. Oct. 1985.

Howard Mizuhara and Toshi Oyama, *Ceramic/Metal Seals*, Engineered Materials Handbook, vol. 4, Ceramics and Glasses, pp. 502–510. No date provided.

* cited by examiner

*Primary Examiner*—Michael Barr
(74) *Attorney, Agent, or Firm*—Robert D. Watson (57) ABSTRACT

This invention relates to a method for preparing the surface of a ceramic component that enables direct brazing using a non-active braze alloy. The present invention also relates to a method for directly brazing a ceramic component to a ceramic or metal member using this method of surface preparation, and to articles produced by using this brazing method. The ceramic can be high purity alumina. The method comprises applying a first coating of a silicon-bearing oxide material (e.g. silicon dioxide or mullite $(3Al_2O_3.2SiO_2)$) to the ceramic. Next, a thin coating of active metal (e.g. Ti or V) is applied. Finally, a thicker coating of a non-active metal (e.g. Au or Cu) is applied. The coatings can be applied by physical vapor deposition (PVD). Alternatively, the active and non-active metals can be co-deposited (e.g. by sputtering a target made of mullite). After all of the coatings have been applied, the ceramic can be fired at a high temperature in a non-oxidizing environment to promote diffusion, and to enhance bonding of the coatings to the substrate. After firing, the metallized ceramic component can be brazed to other components using a conventional non-active braze alloy. Alternatively, the firing and brazing steps can be combined into a single step. This process can replace the need to perform a "moly-manganese" metallization step.

22 Claims, 10 Drawing Sheets

COATING SYSTEM TO PERMIT DIRECT BRAZING OF CERAMICS

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

This application is related to co-pending application, "Surface Preparation of High Purity Alumina Ceramic Enabling Direct Brazing in a Hydrogen Atmosphere", by Charles H. Cadden, Nancy Y. C. Yang, and F. Michael Hosking, all of Albuquerque, N. Mex.; commonly assigned to Sandia Corporation, Albuquerque, N. Mex.

BACKGROUND OF THE INVENTION

This invention relates generally to the field of brazing, and more specifically to a method for preparing the surface of a ceramic component that enables direct brazing using a non-active braze alloy. The present invention also relates to a method for directly brazing a ceramic component to a ceramic or metal member using this method of surface preparation, and to articles produced by using this brazing method. In this context "brazing" is defined as the joining of two or more members using a filler metal that is heated above it's liquidus temperature (e.g. melted) in a non-oxidizing atmosphere at a temperature greater than 450 C.

In U.S. Pat. No. 4,542,073, Tanaka discloses a method for bonding a ceramic first member to a second member made of ceramic or metal, where the method comprises two sequential thermal treatments. The first thermal treatment is performed by heating the ceramic first member in an oxidizing atmosphere from 1200 C. to 1400 C., whereby an oxide surface layer is formed, only if the bulk ceramic contains an oxide-forming element, such as silicon (e.g. Silicon Carbide, Silicon Nitride, or Sialon). Next, a metal sheet (e.g. copper) is placed in-between the two members and a second thermal treatment is performed in a nitrogen atmosphere, whereby the oxidized ceramic surface reacts with the metal sheet to form a chemical bond (e.g. copper oxide). Tanaka teaches that during the second thermal treatment step the peak temperature is not higher than the melting point of the metal filler sheet. Tanaka's limitation precludes the possibility of brazing the two members together, because brazing requires melting of the filler metal, as is practiced by the present invention.

Traditionally, the brazing of ceramic components requires costly surface preparation steps to ensure adequate bonding to the non-metallic substrate, especially when joining a ceramic to a metal (e.g. Kovar, copper, or steel). The conventional preparation process involves formation of a "metallization layer", typically a mixture of molybdenum and manganese powders fired at a high temperature (>1400 C.). Sintering of this mixture produces a well-bonded, glassy coating having a thickness of about 10–40 microns. This is then followed by a nickel-plating step (e.g. electroplating, electroless coating, or nickel oxide painting), following optionally by a sintering step. This provides a continuous metallic surface of about 2–10 microns thick that can be wet by conventional, non-active brazes. Commonly referred to as the "Mo—Mn—Ni" or the "moly-manganese" metallization process, these costly and environmentally unfriendly manufacturing steps require close process control and inspection.

Active braze alloys (ABA's) were developed as an alternative means to directly wet a ceramic, without the necessity for prior metallization of its surface. The ABA's ability to perform successfully as a direct braze depends upon the chemical reaction(s) that occur between the active element (s) in the braze and the ceramic surface. Early active alloy systems primarily utilized titanium (Ti) as the active component, although Zr, Cr, V, Hf, Ta, and Nb have also been used. Small additions of titanium to common face centered cubic (FCC) filler metals (e.g. Cu, Ni, Ag, Au, and their alloys) have been shown to facilitate wetting on alumina through the formation of a titanium-oxide chemical reaction layer (e.g. TiO and $Ti_2O_3$). Unfortunately, Ti-ABA's (e.g. TiCuSil or CuSil-ABA made by Wesgo, Inc., San Carlos, Calif.) are limited to brazing in either vacuum or inert atmospheres, since titanium forms undesirable hydrides in a reactive hydrogen atmosphere.

Recently, a new family of braze alloys has been developed that are more compatible with brazing in a hydrogen atmosphere. These so-called "second-generation" ABA's employ vanadium (V) as the active constituent. They expand the application of active brazing technology to areas where the preferred, or required, furnace atmosphere is dry hydrogen. One example of a second generation V-ABA braze alloy is based on modifying the eutectic binary AWS BAu-4 alloy (82 Au—18Ni) with additions of Mo and V to form a quarternary alloy (75–98% gold, 0.5–20% nickel, 0.5–6% vanadium, 0.25–6% molybdenum, and 0–5% chromium, wt. %). These ductile braze alloys have a liquidus temperature in the range of approximately 960 C. to 1100 C. See U.S. Pat. Nos. 5,385,791; 5,301,861; and 5,273,832 by Mizuhara and Huebel. Such braze joints have yielded generally acceptable hermeticity and tensile strength, but the reaction product(s) responsible for adhesion, a necessary condition for fully realizing the optimum joint properties, is not well understood.

In previous research, the authors fabricated ASTM F-19 tensile specimens of alumina brazed to alumina using Au—16Ni—0.7Mo—1.7V filler metal, that were brazed at 1000 C. in slightly positive dry hydrogen. All of these samples were air-fired (e.g. re-sintered) at 1575° C. in air Drior to brazing, in order to heal surface flaws from grinding. See Mizuhara, H. and Mally, K. 1985, "Ceramic-to-Metal Joining with Active Brazing Filler Metal", Welding Journal 64(10): 27–32. The air-fired/brazed 94% alumina tensile specimens had an average tensile strength of 100 MPa, compared to only 40 MPa average strength for the air-fired/brazed high purity 99.8% alumina samples. The increased joint strengths can be attributed to favorable reactions or synergisms with the 6% balance of other constituents in 94% alumina.

It is well known that direct brazing to alumina using titanium as the active element results in a well-defined titanium-oxide chemical reaction layer. However, the authors could not find a comparable well-defined reaction layer in alumina ceramic joints brazed with a V-containing, gold-based filler alloy. Rather, electron microscopy of those braze joints revealed the presence of a discontinuous spinel-type (Al—V—O) compound of limited thickness, typically less than 30 nm at the metal/ceramic interface. However, machined alumina specimens that were air-fired at 1575° C. prior to brazing exhibited small (<50 angstroms thick) quantities of a silicon-rich constituent on external surfaces. This was particularly evident on 94% alumina specimens, which contain 6% of a deliberately added glassy binder phase consisting of a large fraction of silica ($SiO_2$). Silicon was also detected, albeit in reduced quantities, on high purity 99.8% alumina samples after the air-firing step.

It is possible that the presence of silicon on the surface of the 94% alumina samples during brazing may have contributed to the superior bond strength (100 MPa), as compared to the 99.8% alumina samples strength (40 MPa). This speculation is supported by wetting trials, where surface analysis of a Au—16Ni—0.7Mo—1.7V sessile drop on 94% alumina (melted at 1000 C. in dry hydrogen) revealed solidified braze material concentrated along the exposed glassy phase between the alumina grain boundaries. Thermodynamic calculations of the Gibbs free energy values for simple binary reactions between alumina (or silica) and V (or Mo) indicate that the combination of silica and V produced the lowest free energy value, which is consistent with the observed wetting behavior of the glass grain boundary phase (mostly silica) in the 94% alumina binder. These calculations indicated that silica has only marginal thermodynamic stability in the presence of vanadium at the brazing temperature. Furthermore, $SiO_2$ is reduced at 1000 C. in a hydrogen atmosphere having a dewpoint of approximately –80 C., only slightly drier than the environment used for these experiments (approximately –60 C.). Finally, small quantities of silicon were detected in the braze joints of the 94% alumina specimens; providing evidence of some reduction of $SiO_2$ and diffusion of silicon during brazing.

The presence of the glassy grain boundary phase in the 94% specimens could improve the joint strength of by several potential mechanisms. Since the glassy phase represents approximately 8% (by volume) of the specimen, the surface area of $Al_2O_3$ exposed to the molten braze alloy is reduced accordingly. Secondly, following the air-firing step, a thin (e.g. angstroms) layer of silicon-rich material covers or partially covers the newly exposed (e.g. machined) surfaces. This coverage, in addition to the original 8% surface component, may facilitate wetting and possibly reduce the time necessary for nucleation of the reaction layer.

Finally, the reduction of $SiO_2$ by vanadium, or by the hydrogen braze atmosphere, could lead to the presence of either free silicon or oxygen dissolved in the molten braze filler metal. These compositional changes may locally influence the thermodynamic activity of vanadium in the braze alloy, thus changing the growth kinetics of the interface reaction product. Similarly, Si or O dissolved in the molten filler metal may also act as a catalyst for the reaction.

For these reasons, we concluded that the joint strength and hermeticity of a high purity alumina specimen brazed in hydrogen with a gold-based V-ABA filler metal would be greatly improved by the application of a thin coating of pure silicon to the specimen's surface, followed by firing the Si-coated specimen in air at a high temperature (>1400 C.) for a time sufficient to oxidize at least some of the silicon coating into silicon dioxide. This stable surface preparation technique could allow successful direct brazing to a second member of ceramic or metal using an vanadium active braze alloy in a hydrogen atmosphere, without needing to perform a conventional Mo—Mn—Ni metallization step.

An alternative approach to this process is to directly deposit a coating of a silicon-bearing oxide material, such as silicon dioxide or mullite ($3Al_2O_3.2SiO_2$), on to the ceramic part, and thereby skip the step of firing in air at high temperature, since the oxide is already present in silicon dioxide or mullite. An advantage of not using an air-firing step is the benefit of not subjecting the component(s) to a potentially severe thermal stress cycle. Also, eliminating the air-firing step reduces cost and processing time.

An alternative approach to using active braze alloys (ABA's) is to deposit the active braze element (V, Ti, etc.) directly on to the silicon dioxide or mullite coated ceramic. This can be followed by depositing a coating of the non-active metal (e.g. Au, Cu, Ni). Alternatively, both the active and non-active elements (e.g. V and Au; Ti and Cu) can be co-deposited. The part can be fired in a non-oxidizing atmosphere at high temperature (>500 C.), to promote diffusion and enhanced bonding between the layers of coatings and to the substrate. Since the ceramic component has a metallic coating of gold, copper, nickel, etc., it then can be later directly brazed to a second part using conventional non-active braze alloys. Alternatively, the firing step can be combined with the brazing step and performed as a single step. This novel preparation process can eliminate the need for performing the moly-manganese metallization step, and the nickel electroplating step, with the attendant OSHA and industrial waste issues. The coatings can be easily applied, which reduces sensitivity of the final assembly to brazing process parameters.

DETAILED DESCRIPTION OF THE INVENTION

This invention relates to a method for preparing the surface of a ceramic component that enables direct brazing using a non-active braze alloy. The present invention also relates to a method for directly brazing a ceramic component to a ceramic or metal member using this method of surface preparation, and to articles produced by using this brazing method.

Figure 1:
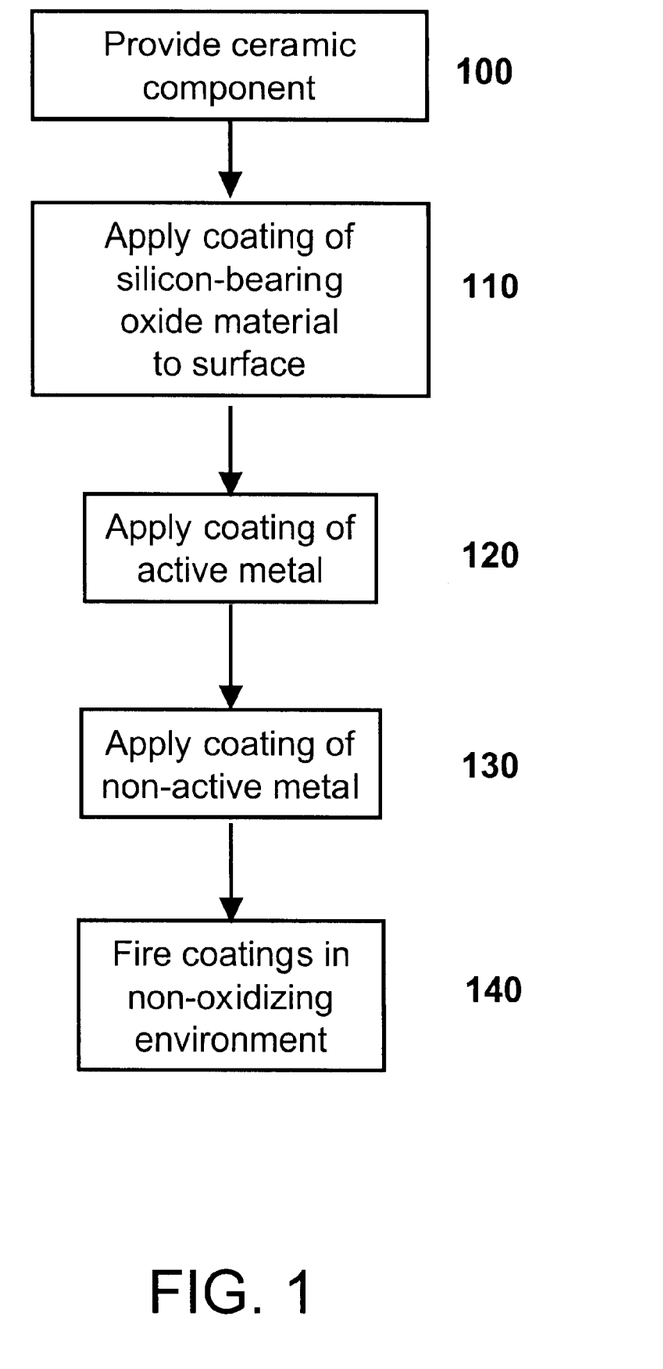
FIG. 1 shows a first example of a method of preparing a ceramic surface for brazing by using a coating system, according to the present invention.

FIG. 1 shows a first example of a method of preparing a ceramic surface for brazing by using a coating system, according to the present invention. In step 100, a ceramic component (e.g. high purity alumina) is provided. Next, in step 110, a first coating of a silicon-bearing oxide material is applied to at least the surface to be bonded of the ceramic component. The silicon-bearing oxide coating can be silicon dioxide or mullite ($3Al_2O_3.2SiO_2$). The silicon-bearing oxide coating can be applied by a variety of methods well known in the art. Because the silicon-bearing oxide coating can provide an effective preparatory coating with a thickness in the range of 25 to 2500 angstroms, the method of physical vapor deposition (PVD) is ideally suited for this application. Details of the PVD method will be provided later.

Other methods of deposition, also well known in the art, can be used to deposit an effective coating of silicon dioxide or mullite. Some examples include physical sputtering, chemical vapor deposition (CVD), plasma-assisted chemical vapor deposition (PA-CVD), thermal evaporation, thermal spray, plasma spray, cold spray, and ion-beam deposition, or combinations thereof. Physical sputtering can be used to deposit mullite by using a mullite sputtering source. Alternatively, a mixture of silicon-bearing oxide powder and a volatile binder can be applied by painting, screen-printing, or spraying, and subsequently fired to volatize and remove the binder.

In the experimental results presented later, two different thicknesses of silicon were applied: 25 Angstroms and 2500 Angstroms, and later converted into silicon dioxide by firing in air at a high temperature (e.g. 1575 C. for 2 hours). However, it is believed that silicon-bearing oxide coating thicknesses as small as 10 Angstroms, and as large as 1 micron, would also be effective as a preparatory coating for direct brazing. In the first example shown in FIG. 1 of the present invention, the silicon dioxide coating (for example) can applied directly, rather than using the two-step approach of (1) applying a silicon coating, and (2) oxidizing it to silicon dioxide by air-firing at high temperature.

Referring still to FIG. 1, in step 120 a second coating of an active metal is applied to the first coating. Early active alloy systems primarily utilized titanium (Ti) as the active component, although Zr, Cr, V, Hf, Ta, and Nb have also been used. Small additions of titanium to common face centered cubic (FCC) filler metals (e.g. Cu, Ni, Ag, Au, and their alloys) have been shown to facilitate wetting on alumina through the formation of a titanium-oxide chemical reaction layer (e.g. TiO and $Ti_2O_3$). Unfortunately, Ti-ABA's (e.g. TiCuSil or CuSil-ABA made by Wesgo, Inc., San Carlos, Calif.) are limited to brazing in either vacuum or inert atmospheres, since titanium forms undesirable hydrides in a reactive hydrogen atmosphere.

Recently, a new family of braze alloys has been developed that are more compatible with brazing in a hydrogen atmosphere. These so-called "second generation" ABA's employ vanadium (V) as the active constituent. They expand the application of active brazing technology to areas where the preferred, or required, furnace atmosphere is dry hydrogen. One example of a second generation V-ABA braze alloy is based on modifying the eutectic binary AWS BAu-4 alloy (82 Au—18Ni) with additions of Mo and V to form a quarternary alloy (75–98% gold, 0.5–20% nickel, 0.5–6% vanadium, 0.25–6% molybdenum, and 0–5% chromium, wt. %). These ductile braze alloys have a liquidus temperature in the range of approximately 960 C. to 1100 C. See U.S. Pat. Nos. 5,385,791; 5,301,861; and 5,273,832 by Mizuhara and Huebel. Such braze joints have yielded generally acceptable hermeticity and tensile strength, but the reaction product(s) responsible for adhesion, a necessary condition for fully realizing the optimum joint properties, is not well understood.

The following reactive elements: Ti, Zr, Cr, V, Hf, Ta, and Nb (or combinations thereof) can be used as the coating of active metal. However, brazing or firing (e.g. heat treating) a coating that. contains titanium should preferably be performed in a vacuum environment or inert gas atmosphere, rather than a hydrogen atmosphere. The other active elements (e.g. excluding titanium) can be heated in any non-oxidizing environment, including hydrogen. The range of thicknesses of the active metal coating can be from 10 angstroms to 1 micron.

Referring still to FIG. 1, in step 130 a third coating of a non-active metal is applied to the second coating. Examples of suitable non-active metals include: gold, copper, nickel, silver, palladium, indium, and molybdenum; or combinations thereof. In general, the non-active metal layer is thicker than the active metal layer. The range of thicknesses of the non-active metal coating can be from about 0.1–10 microns. Any of the deposition methods described used for depositing both the second and third coatings, although PVD and physical sputtering are preferred methods.

Referring still to FIG. 1, in final step 140 the ceramic component (now with three coatings) can be fired at a high temperature in a non-oxidizing environment (e.g. vacuum, inert gas, or hydrogen). The purpose of the firing step is to promote diffusion of elements, and to enable chemical reactions that promote enhanced bonding between the multiple layers and with the ceramic substrate. For example, it is desirable to form a reaction layer between the active metal (e.g. Ti, V) and the silicon-bearing oxide first coating; resulting in the formation of titanium oxide, or vanadium oxide. Alternatively, if the ceramic component comprises alumina (e.g. aluminum oxide), another desirable reaction layer is the formation of a compound containing a mixture of aluminum, vanadium, and oxygen (e.g. $VAlO_4$). As will be explained later, the presence of silicon is believed to play an important role in promoting enhanced bonding and reactions between these various layers of coatings and with the ceramic substrate.

Referring to step 140, the use of higher firing temperatures generally provides faster and more complete reactions.

The range of firing temperatures can be as low as 500 C., with a preferred range of 1000–1300 C., for a holding time of 1–2 hours. Alternatively, the firing temperature can be above the liquidus temperature of the non-active metal component of the coating. The optimum selection of time and temperature will naturally depend on the specific choices of materials for each of the three coating layers. The lower the firing temperature, the longer the holding time will be required, in general. After firing is completed, the surface of the ceramic component is metallized and, hence, becomes prepared for direct brazing.

Figure 2A:
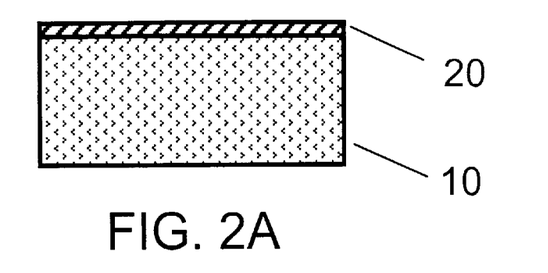
FIG. 2A shows a second example of a specimen of high purity alumina, coated with a layer of silicon dioxide or mullite, according to the present invention.
Figure 2B:
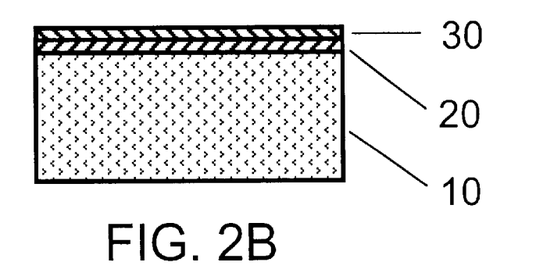
FIG. 2B shows a coating of active metal (e.g. V, Ti) applied by PVD to the specimen of FIG. 2A in a non-oxidizing environment, according to the present invention.
Figure 2C:
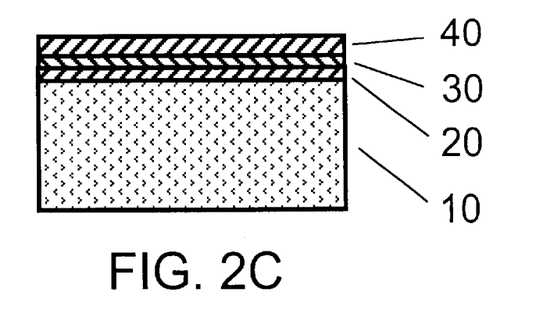
FIG. 2C shows a coating of non-active metal (e.g. Au, Cu) applied by PVD to the specimen of FIG. 2B in a non-oxidizing environment, according to the present invention.
Figure 2D:
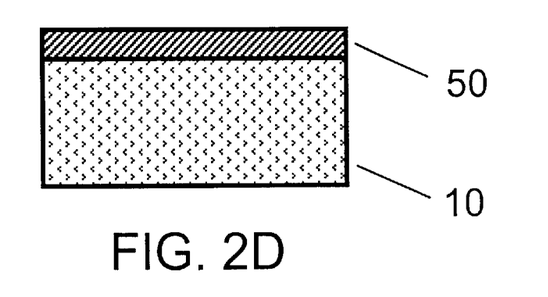
FIG. 2D shows the specimen of FIG. 2C after exposure to high temperature in a non-oxidizing environment, whereby diffusion and chemical reactions in the multiple layers has occurred, thereby enhancing bonding to the alumina substrate, according to the present invention.

FIGS. 2A–D illustrate a second example of a method of preparing the surface for direct brazing by using a coating system, according to the present invention. In FIG. 2A, a ceramic component 10 (e.g. high purity alumina) has been provided, having a first coating of silicon dioxide applied to at least the surface to be bonded. Next, in FIG. 2B, a second coating 30 of active metal (e.g. vanadium) has been applied to the first coating 20. Then, in FIG. 2C, a third coating 40 of non-active metal (e.g. gold) has been applied on top of the second coating 30. Finally, in FIG. 2D, the triple-coated ceramic specimen 10 has been fired at high temperature (e.g. 1200 C.) in a non-oxidizing environment, whereby the coatings become well-bonded to the substrate. This prepares the surface of ceramic component 10 for direct brazing using a non-active braze alloy by forming a strongly adhering metallic coating 50.

Figure 3:
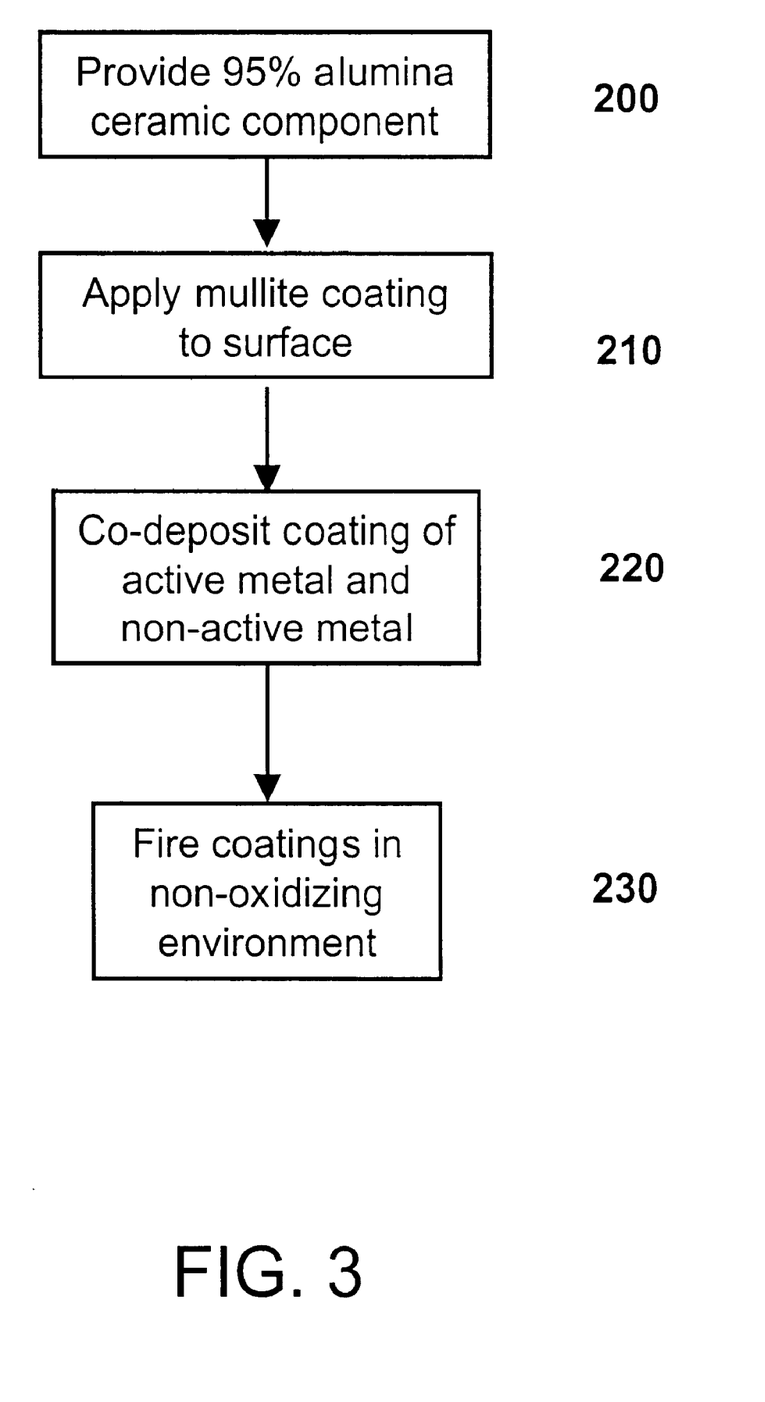
FIG. 3 shows a third example of a method of preparing a ceramic surface for brazing by using a coating system, according to the present invention.

FIG. 3 illustrates a third example of a method of preparing the surface for direct brazing by using a coating system, according to the present invention. In step 200, a ceramic component (e.g. 94% alumina) is provided. Next, in step 210, a first coating of mullite ($3Al_2O_3.2SiO_2$) is applied to at least the surface to be bonded of the ceramic component. Then, in step 220, a second coating including both active metal and non-active metal (at least one of each) is co-deposited on to the top of the first coating. This combines into one step the previous two steps shown in FIG. 1 (e.g. steps 120 and 130). Co-deposition of both active and non-active metal elements can be accomplished by physical sputtering or vapor deposition from a mixed source (e.g. a metallurgical alloy or a mechanically-alloyed composite). For example, co-deposition can be accomplished by sputtering a target made of Cu—Ag-Ti (e.g. TiCuSil). Combining steps 120 and 130 into a single step 220 can save money and time, while improving quality control. Finally, in step 230 the ceramic component (now with two coatings) is fired at a high temperature in a non-oxidizing environment to enhance bonding of the layers. The component is now prepared for subsequent direct brazing using a non-active braze alloy.

Figure 4A:
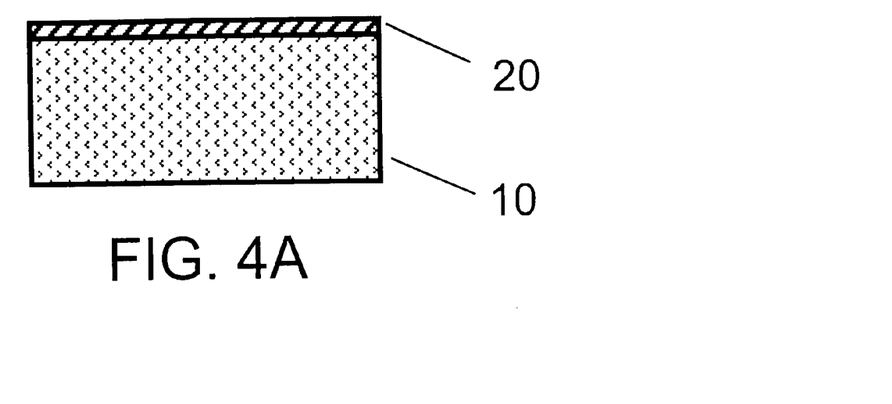
FIG. 4A shows a fourth example of a specimen of high purity alumina, PVD coated with a layer of silicon dioxide or mullite, according to the present invention.
Figure 4B:
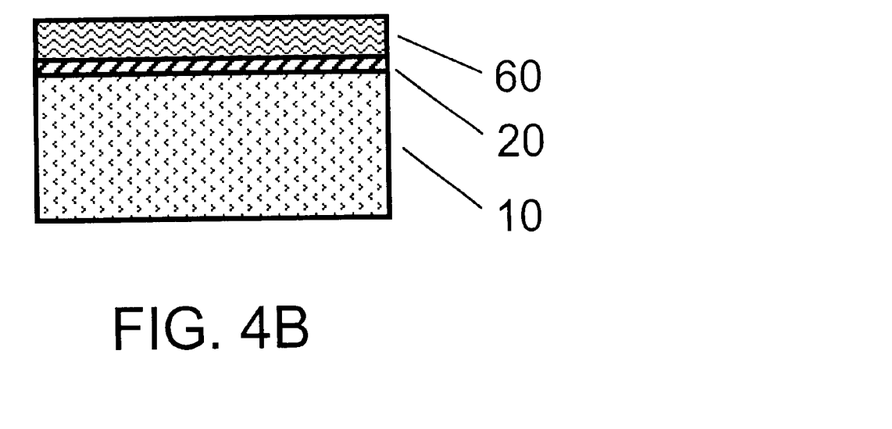
FIG. 4B shows a coating of both active metal (e.g. V, Ti) and non-active metal (e.g. Au, Cu) applied by co-depositing both materials on to the specimen of FIG. 4A in a non-oxidizing environment, according to the present invention.
Figure 4C:
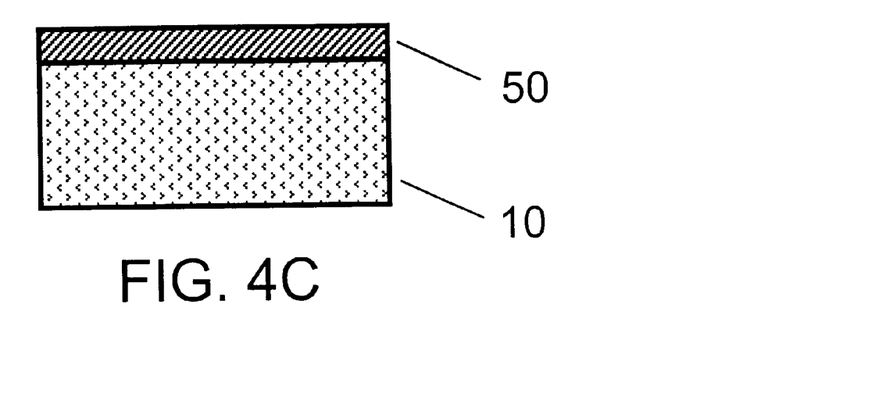
FIG. 4C shows the specimen of FIG. 4B after exposure to high temperature in a non-oxidizing environment, whereby diffusion and chemical reactions in the multiple layers has occurred, thereby enhancing bonding to the alumina substrate, according to the present invention.

FIG. 4A shows a fourth example of a specimen of high purity alumina 10, PVD coated with a layer of silicon dioxide or mullite 20, according to the present invention. FIG. 4B shows a coating of a mixture including at least one active metal (e.g. V, Ti) and at least one non-active metal (e.g. Au, Cu); applied by co-depositing both materials on to the specimen of FIG. 4A in a non-oxidizing environment. FIG. 4C shows the specimen of FIG. 4B after exposure to high temperature. (e.g. firing) in a non-oxidizing environment, whereby diffusion and chemical reaction in the multiple layers has occurred, thereby enhancing bonding to the alumina substrate. The fired coating 50 is substantially metallic, which prepares the ceramic for direct brazing using a non-active braze alloy.

Figure 5:
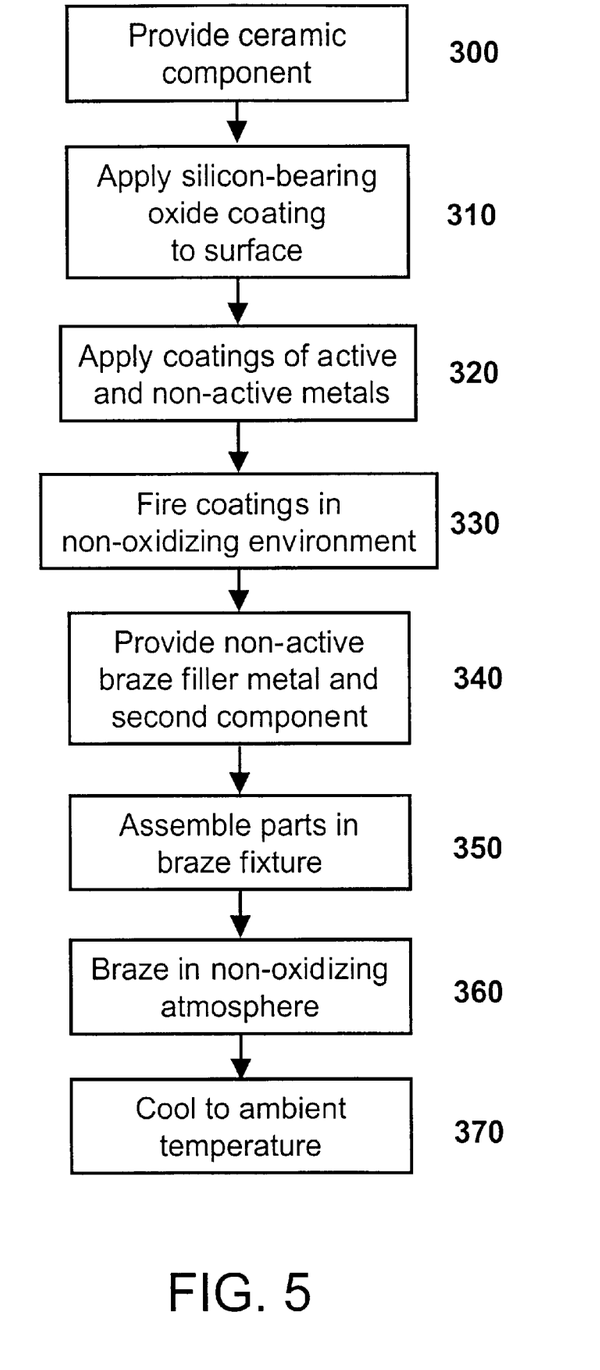
FIG. 5 shows a fifth example of a method of joining two components together, according to the present invention.

FIG. 5 shows a fifth example of a method of joining two components together, according to the present invention. In step 300, a ceramic component (e.g. high purity alumina) is provided. Next, in step 310, a first coating of a silicon-bearing oxide material is applied to at least the surface to be bonded of the ceramic component. Then, in step 320, a coating is applied that contains at least one active and at least one non-active metal. The two different metal species can be applied either sequentially, or simultaneously. Next, in step 330 the coated ceramic component is fired at high temperature in a non-oxidizing environment. The firing step 330 can promote reactions with the active metal component, and can enhance bonding of the coatings. Ceramic components prepared according to steps 300 through 330 can subsequently be shipped or stored until needed.

The next stage is to join the prepared ceramic components to at least one other component. In step 340 a non-active braze filler metal part, and a second component are provided. Suitable non-active braze filler metals include Cu, Ni, Ag, Au, and their alloys. Preferred non-active braze alloys include a gold-palladium alloy, a gold-copper alloy, a gold-nickel alloy, and a gold-copper-nickel alloy. The active braze filler metal can be in the form of a foil, wire, paste, powder, or thin film coating (such as might be deposited by PVD, CVD, sputter-plating, electroplating, etc.). A preferred form is a foil.

Alternatively, in step 340, active braze alloys can be used (e.g. TiCuSil, CuSil-ABA, or Au—16Ni—0.7Mo—1.7V, wt. %). However, because the surface of alumina ceramic component 10 has already been metallized with metallic coating 50, it is not required to use an active braze alloy for step 340.

Next, in step 350 the filler metal is placed in-between the coated/fired ceramic component and the second member to be joined, and the parts are assembled in their proper orientation. A braze fixture, well-known in the art, can be used to provide proper alignment of the parts during brazing. Next, in step 360 the assembly is brazed in a non-oxidizing environment by heating to a temperature above the liquidus temperature of the braze filler metal.

Any method of heating, well known in the art, can be used. Examples include resistance furnace, induction furnace, direct resistive (e.g. Joule) heating, laser heating, IR lamp heating, and electron-beam heating. Preferably, a resistance furnace is used. The furnace atmosphere can be an inert gas, such as dry, high-purity argon, helium or nitrogen. Alternatively, a vacuum can be used. Alternatively, the braze furnace can have a dry hydrogen atmosphere with a slightly positive pressure, and a dew point of about −60 C. If titanium is used, it is preferred to avoid exposure to hydrogen gas during brazing to prevent formation of undesirable titanium hydrides. The heating step 360 can include holds at various intermediate temperatures (e.g. to provide for adequate thermal equalization, or to accomplish desired metallurgical transformations). Finally, in step 370, the brazed assembly is cooled back down to room temperature, preferably slowly.

Figure 6A:
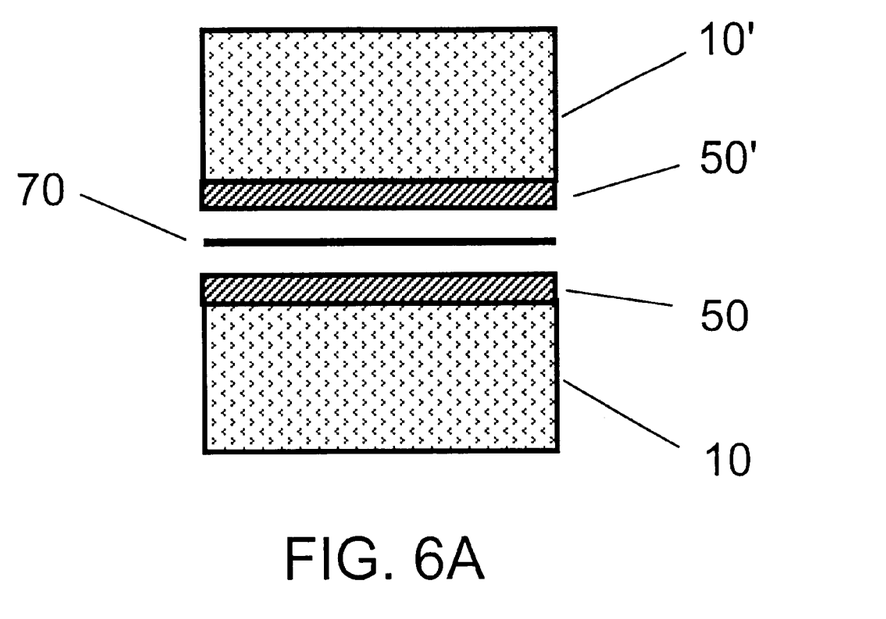
FIG. 6A shows a sixth example of a method of joining two ceramic components together, prior to brazing, according to the present invention.
Figure 6B:
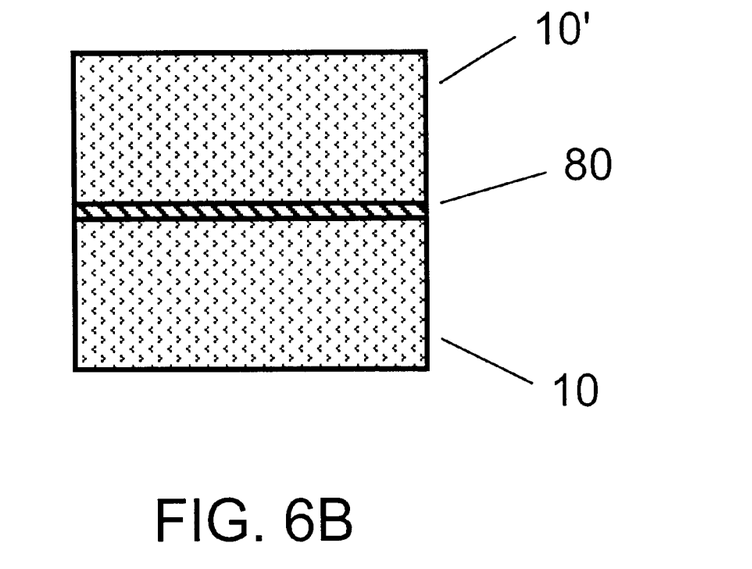
FIG. 6B shows a sixth example of a method of joining two ceramic components together, after brazing, according to the present invention.

FIG. 6A shows a sixth example of a method of joining two ceramic components together, prior to brazing, according to the present invention. A piece of braze alloy 70 has been placed in-between two ceramic components 10 and 10'. Both ceramic components have been prepared using the coating system described in either FIG. 1 or FIG. 3. This coating system produces a well-bonded, metallized layer 50 and 50', suitable for brazing with a non-active braze alloy. In FIG. 6B the assembly shown in FIG. 6A has been brazed in a non-oxidizing atmosphere to form a useful article comprising a braze joint 80 joining together ceramic components 10 and 10'.

Figure 7:
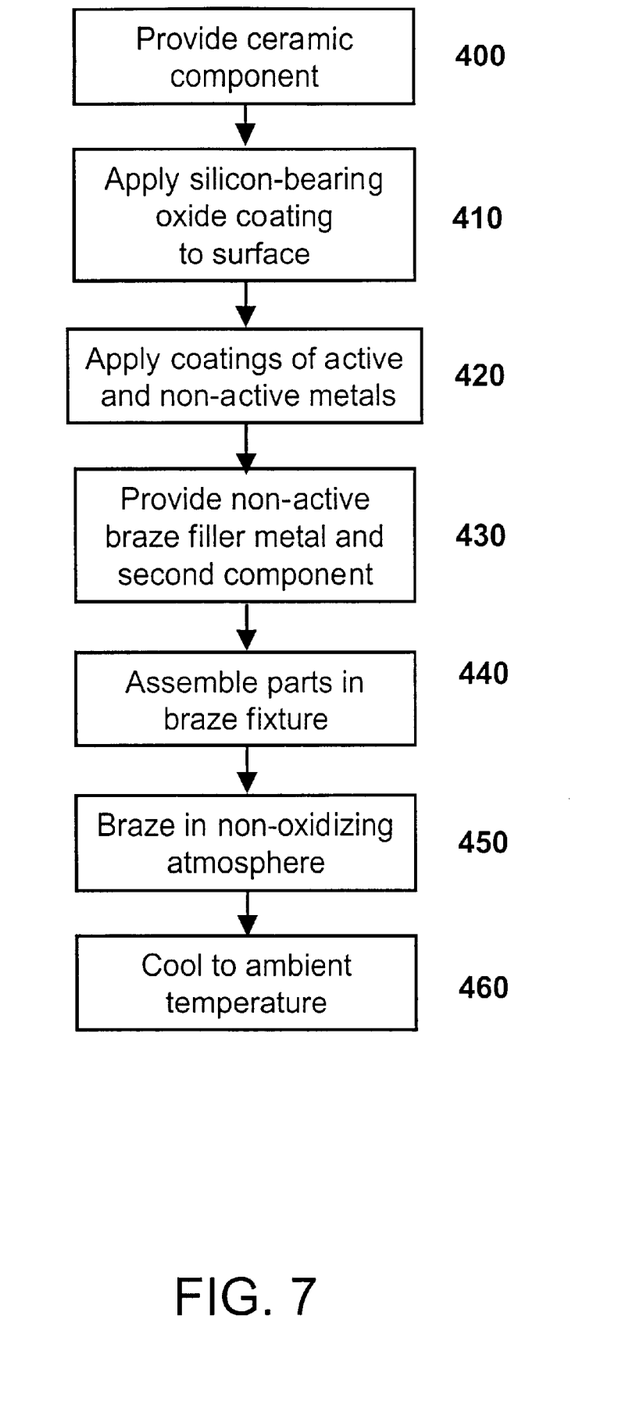
FIG. 7 shows a seventh example of a method of joining two components together, according to the present invention.

FIG. 7 shows a seventh example of a method of joining two components together, according to the present invention. This method is essentially identical to that shown in FIG. 5, except that in FIG. 7 the firing step has been combined with the brazing step 450, and both are performed simultaneously. In the example of FIG. 7, the high temperature brazing step 450 performs the same function as the firing step 330, namely, to promote diffusion of the active element(s), and to enhance bonding of the coatings to the ceramic substrate. The advantage of this embodiment over the example shown in FIG. 5 is elimination of an extra thermal stress cycle (e.g. firing), and reduction of cost and manufacturing time.

Figure 8A:
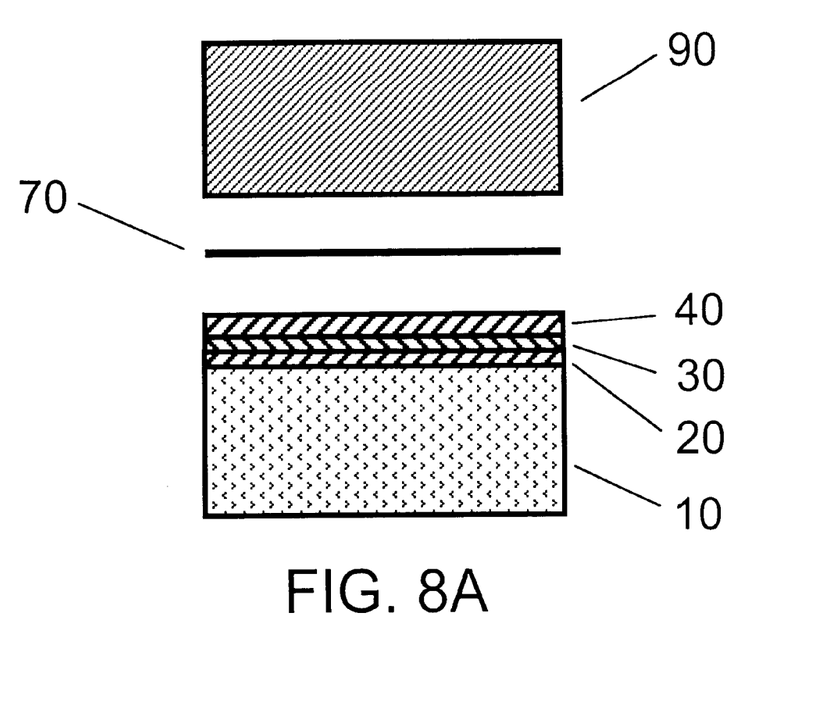
FIG. 8A shows a eighth example of a method of joining a ceramic and a metallic component together, prior to brazing, according to the present invention.
Figure 8B:
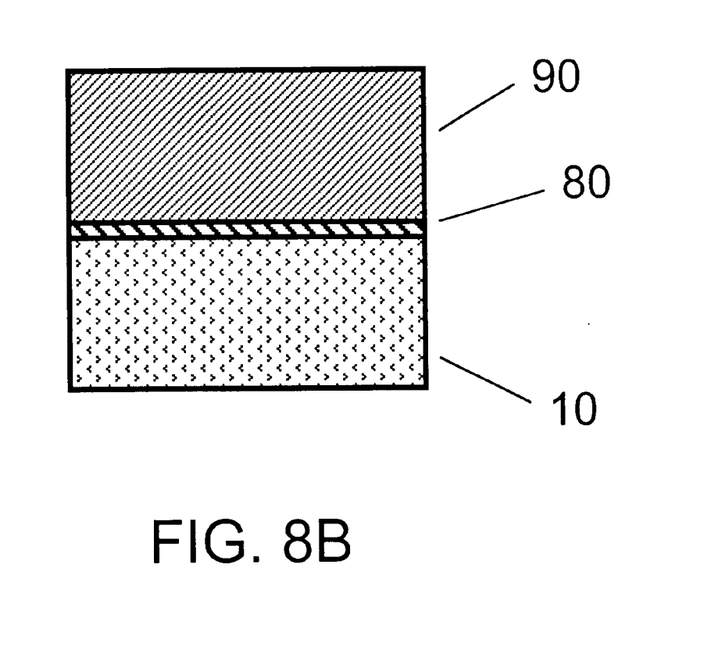
FIG. 8B shows a eighth example of a method of joining a ceramic and a metallic component together, after brazing, according to the present invention.

FIG. 8A shows a eighth example of a method of joining a ceramic and a metallic component together, prior to brazing, according to the present invention. Ceramic component 10 has been coated by PVD with three layers (20, 30, 40). The first coating 20 comprises silicon dioxide or mullite. The second coating 30 comprises an active metal. The third coating 40 comprises a non-active metal. Braze foil 70 has been placed in-between the coated ceramic component 10, and a metallic component 90. The metal component 90 does not need to be coated, since the braze alloy can directly wet most metals of commercial interest. As described in the seventh example shown in FIG. 7, the three coatings in FIG. 8A are not fired before the brazing step. Instead, the firing step is combined with the brazing step. In FIG. 8B the assembly shown in FIG. 8A has been brazed in a non-oxidizing atmosphere to form a useful article comprising a braze joint 80 joining together the ceramic component 10 and the metallic component 90.

The following text provides a detailed description of a series of experiments that were performed by the authors, which serve as relevant examples of the practice of the present invention.

Materials and Test Specimens

Figure 9:
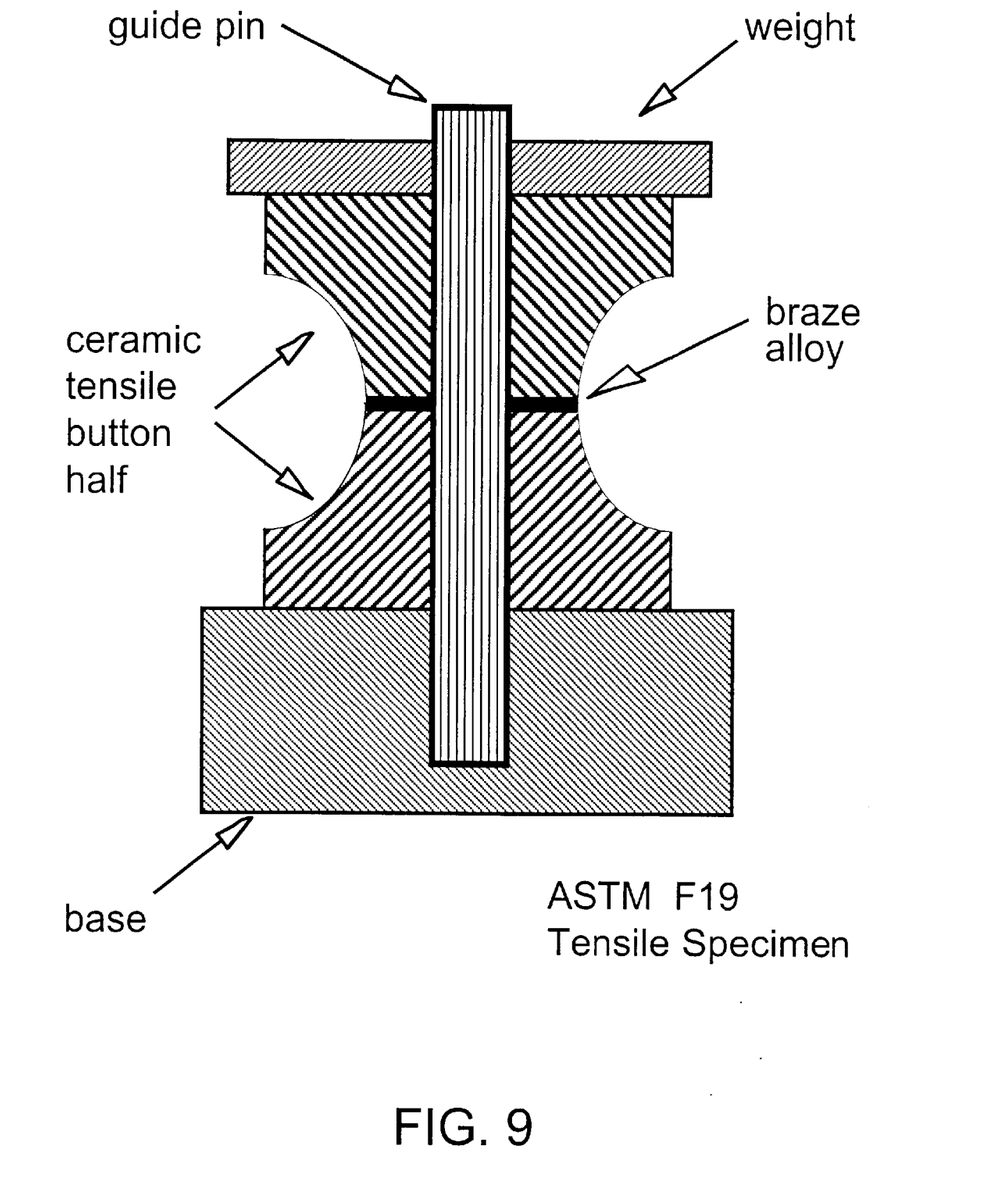
FIG. 9 shows an ASTM F19 tensile specimen, used for testing the ultimate strength of a ceramic-to-ceramic braze joint.

The base material consisted of a commercial grade of 99.8 weight % alumina ceramic procured from Coors Ceramics, Golden, Colo. Specimens were machined to a geometry based on the ASTM F19-64 tensile button specimen, as shown in FIG. 9, for evaluating the tensile strength of brazed ceramics. The filler composition used was a commercially available gold-based alloy containing 16% Ni, 0.75% Mo and 1.75% V (wt. %). Braze preforms were fabricated from 0.076 mm (0.003 in) thick foil stock obtained from Wesgo, Inc., San Carlos, Calif.

The annular bonding surface of each as-fabricated (i.e., machined) ceramic tensile button was coated with a thin layer of pure silicon. Plasma vapor deposition (PVD) was used to deposit silicon in two thicknesses: 25 angstroms (0.1 $\mu$in.) or 2500 angstroms (10 $\mu$in.). The ceramic samples were given a standard cleaning treatment. Samples were then mounted 12 inches above a silicon source. The silicon source was heated to about 1400 K using a 10 KV electron beam gun. The system was pumped down to less than $5\times10^{-6}$ Torr. The parts were coated at ambient temperature. The 25 angstrom thick silicon coating was deposited at a rate of 1–2 angstroms/second. The 2500 angstrom thick coating was deposited at a rate of 10 angstroms/second. Once the silicon source was cool, the chamber was brought up to atmosphere and the parts removed.

Following the coating step, the alumina buttons were placed in 99.8% alumina crucibles and fired in a resistance heated air furnace at 1575° C. (2867° F.) for 2 hours. The refractory lining of the furnace consisted of bricks of approximate composition 50% $SiO_2$ and 47% $Al_2O_3$, with small amounts of iron and titanium oxides.

Surface analyses of tensile buttons (one of each Si thickness and an uncoated 99.8 and 94% specimen) was conducted after air firing. Secondary Ion Mass Spectroscopy (SIMS) was performed using a Physical Electronics Model TRIFT-1 instrument to analyze surface compositions. Specimens were subsequently carboncoated and examined using a JEOL 6400 Field Emission Scanning Electron Microscope (FESEM) equipped with Energy Dispersive X-ray Spectroscopy (EDS).

Brazing Conditions

Eight tensile specimens, four representing each of the two Si coating thicknesses, were brazed at 1000° C. (1832° F.) in a slightly positive dry hydrogen atmosphere with a dewpoint of approximately −60° C. The test specimens were heated in a fixture designed to maintain axial alignment. A small weight was placed on top of the ceramic/braze foil assembly to produce a total bonding pressure of 1.0 psi (7 kPa). The programmed furnace thermal profile was:

Heat from ambient to 925° C. at 10° C./min

Soak at 925° C. for 10 min.

Heat from 925 to 1000° C. at 5° C./min.

Soak at 1000° C. for 5 min.

Furnace cool to 800° C. at approximately 15° C./min.

Continue furnace cool from 800° C. to 400° C. at 10° C./min.

Complete remaining cool to ambient at 5° C./min.

The furnace temperature was controlled with thermocouples located on the fixtured tensile specimens. Orientation in the furnace (top vs. bottom) was maintained for each tensile sample.

Test Conditions

Prior to mechanical testing, the ASTM F19 tensile specimens were checked for hermeticity using an Alcatel ASM-10 Helium Leak Detector. The open central region of the test specimen was evacuated and helium was introduced around the outer fillet. If no leaks were detected, the test scale was changed to increasing helium sensitivity levels until the machine limit was reached. If a leak was detected, the leak range was quantified. All eight of the tensile specimen assemblies (four brazed with each of the two silicon coating thicknesses) exhibited hermetic joints, i.e. no detectable leaks were found.

Room temperature tensile tests were performed with a hydraulic load frame in displacement control mode at a test rate of 0.0076 mm/s (0.0003 in/s). Universal joints were used to align the test specimens in the grips during tension testing. The "top" half of each specimen, as determined by its orientation in the brazing furnace, was loaded in the upper grip of the test machine.

Finally, one brazed tension specimen from each processing group was selected for microstructural analyses. A sample was cross-sectioned, mounted, and metallographically polished for examination using both optical and scanning electron microscopy. Additionally, several fracture surfaces of failed tensile specimens were examined.

Experimental Results

SIMS analysis of the air-fired surfaces indicated the presence of Ca, Mg, Na and K, in addition to Al and Si on all samples. By using the Al peaks, the Si peak energies were corrected and found to be consistent with $SiO_2$. Silicon levels were found to be approximately 7% on an air-fired 94% alumina sample, and 4%, 7% and 11% respectively on uncoated (bare), 25 angstrom and 2500 angstrom silicon coated 99.8% alumina respectively. The K and Ca values were approximately constant for the three 99.8% alumina samples. Surfaces of the 94% alumna contained substantially higher K and a reduced Ca content.

SEM images of the four air fired surfaces were analyzed. The 94% alumina specimen appears to have a majority of grains that possess fine, slightly roughened surfaces. Only a small amount, approximately 10% of the surface area, was composed of smooth, sharply cleaved facets. Conversely, the 99.8% alumina uncoated surface shows a slight majority (≈60%) of clean faceted grains. Surfaces of the Si-coated high purity alumina had increased amounts of the "rough" features, approximately 60 and 80 area % for the 25 and 2500 angstrom coated samples, respectively. Surprisingly, the surface coverage of the air-fired 2500 angstrom coating was not continuous. EDS analysis of the smooth facets, in all specimens, indicated low silicon content at these areas of less than 0.5 weight %. Silicon content of the rough areas varied; measurements of between 3% and 7% were obtained. Note that whereas EDS utilizes a higher energy electron beam, compositional values are more likely to reflect combined surface and substrate chemistry and are consequently less reliable than the above-mentioned mass spectrometer (SIMS) results which measured average surface composition. However, the EDS data clearly indicate that the silicon content is not uniformly distributed across the ceramic surfaces, but rather concentrated at certain locations.

A typical braze joint microstructure was observed to have a thickness of 60–80 $\mu$m (0.002–0.003 in); is porosity-free; and has several phases distributed throughout the microstructure. Large globular Ni-rich features were observed in the upper half of each joint; the remainder of the microstructure consisted of large, two phase grains separated by finer particles. Generally, the solidified braze filler metal maintained intimate contact with the alumina substrate along the bond interface, with only isolated locations where slight separations were found between the metal and alumina. No significant microstructural differences were found in these specimens compared to previously brazed, uncoated alumina samples.

Figure 10:
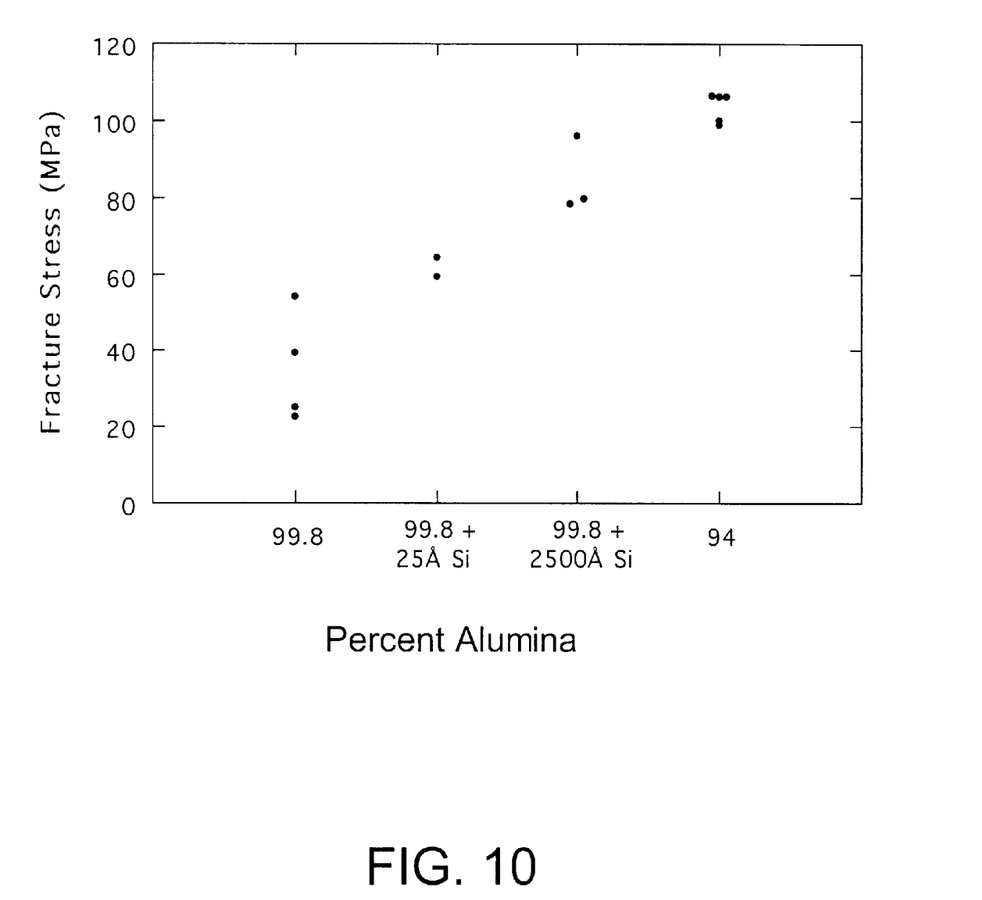
FIG. 10 shows results of ASTM F19 tensile tests for various grades of alumina specimens direct brazed in dry hydrogen at 1000 C. with an V-ABA alloy, with and without a thin coating of PVD silicon, followed by air-firing at 1575 C. for 2 hours, according to a related invention.

Tensile test results are shown in FIG. 10. They are compared with previously obtained values for the two uncoated grades of alumina (94% and 99.8%). The silicon-coated/air-fired 99.8% high purity alumina specimens had improved room temperature tensile strength compared to their uncoated/air-fired 99.8% counterparts, more than double that Without any silicon coating. However, none of silicon-coated specimens yielded greater tensile values than the uncoated/air-fired 94% alumina grade ceramic (possibly because the silicon was already present in the 6% glassy phases of the 94% alumina grade).

Although the thinner silicon coating (25 A) was not as effective as thicker coatings (2500 A), these results indicate that the improvement in performance is not sensitive to minor variations in coating thickness. Consequently, the coating thickness need not be carefully controlled.

Examination of the fracture surfaces indicated that failures were located at or near the "lower" metal-ceramic interface of each braze joint. This result is in agreement with the previous observations for uncoated specimens. In the uncoated 99.8% specimens, fractures were dominated by clean separation at the metal-ceramic interface. However, in the coated specimens significant portions of the substrate (e.g. ceramic) fractured. Specimens fabricated using the angstrom silicon coating showed nearly equal amounts of ceramic and interface failure; those specimens that were given the thicker silicon coating exhibited approximately 60 to 70% (by area) substrate failure. The uncoated 94% alumina specimens failed almost exclusively in the ceramic substrate.

Furthermore, the fracture surfaces of uncoated 99.8% alumina specimens were characterized by a clean separation; almost no deformation was evident on the resulting metallic surfaces. Corresponding surfaces of the silicon-coated specimens revealed localized deformation of the metallic side of the interface during fracture.

The experimental results indicate that a thin coating of silicon on high purity 99.8% alumina more than doubles the tensile strength of the braze joint when the silicon coating is air-fired at a high temperature (e.g. 1575 C. for 2 hours) prior to brazing.

In additional tests, when the step of air-firing the silicon-coated samples was eliminated, no increase in the brazed tensile joint strength could be found. Likewise, no increase in strength could be found if the silicon was added directly to the braze alloy composition, rather than being PVD-coated onto the alumina's surface and then air-fired. This further supports the importance of converting the thin silicon coating to at least a semi-continuous layer of silicon dioxide prior to brazing.

Discussion

The beneficial effect of silicon on mechanical strength may be the result of one or more contributing phenomena. The $SiO_2$-containing film may be partially or completely reduced during brazing in the hydrogen atmosphere, resulting in free silicon dissolved in the molten braze alloy. Since the $SiO_2$-containing surface layer on the coated samples is very thin compared to the total braze joint width, it seems unlikely that the presence of such limited quantities of silicon would substantially alter bulk properties of the solidified filler metal (lattice parameter, thermal expansion coefficient, modulus, etc.)

Examination of the $Al_2O_3$—$SiO_2$ system indicates negligible solubility of $SiO_2$ in $Al_2O_3$. It is known that at temperatures of 1650° C. and above, semi-infinite diffusion couples formed thin layers of mullite ($3Al_2O_3.2SiO_2$) at the interface. At lower temperatures (1550 and 1580° C.), comparable to the air-fired temperature in the current investigation, the mullite phase was absent. However, an amorphous phase of higher $SiO_2$ composition was found. The absence of the mullite phase was attributed to its rapid dissolution into the liquid $SiO_2$ phase. In the current study, the thin surface coating of silicon likely oxidizes to $SiO_2$ during heating to 1575° C. The subsequent layer of molten $SiO_2$ would be very thin. Dissolution of a mullite reaction layer would rapidly saturate the liquid $SiO_2$ with $Al_2O_3$, thereby stabilizing the growth of a thin mullite film at the $Al_2O_3$ interface. Reduction or dissolution of the predominantly $SiO_2$ surface layer would then expose a thin mullite layer to the molten active filler metal. Mullite may offer superior (compared to $Al_2O_3$) wetting and adhesion characteristics for the V-containing braze alloy.

Alternatively, silicon may participate at one or more of the interfaces, specifically: braze alloy/alumina, braze alloy/reaction layer, or reaction layer/alumina. Note that silicon does not appear to be a component of the interfacial reaction product. We identified this compound in both the 99.8% and 94% alumina joints as an Al—V—O constituent, which was void of silicon. Although slight amounts of silicon were found in the bulk solidified filler metal of 94% alumina joints, prior efforts were unable to detect the presence of silicon at the metal-ceramic interface.

In summary, room temperature tensile strength was found to be proportional to the fraction of air fired surface covered by silicon-containing films. Similarly, the ratio of substrate fracture versus interface separation was also related to the amount of surface silicon present prior to brazing.

The particular sizes and equipment discussed above are cited merely to illustrate a particular embodiment of this invention. It is contemplated that the use of the invention may involve components or methods having different characteristics. For example, the method may be used for ceramics other than high-purity alumina (e.g. a ceramic with less than 99.8% alumina composition by weight, sapphire, silicon carbide, silicon nitride, sialon, mullite, aluminum nitride, zirconia, partially stabilized zirconia, and beryllium oxide, or combinations thereof).

It is well known that grinding of alumina specimens can introduce extensive surface fractures, up to 50 microns deep. See Mizuhara, H. and Mally, K. 1985, "Ceramic-to-Metal Joining with Active Brazing Filler Metal", Welding Journal 64(10): 27–32. Subsequent lapping of the ground surface can remove these surface flaws. Alternatively, re-sintering by heating in hydrogen for 30 minutes at 1500 C., or by heating in air for 30–60 minutes at 1600–1650 C., can heal these cracks by liquid phase flow of the glassy phases present in less-than-100% pure alumina ceramics. Re-sintering at 1575 C. for 2 hours in air is currently recommended by a manufacturer of alumina products to heal these cracks. It may be desirable to perform this resintering procedure before preparing any alumina components for brazing.

It is intended that the scope of the invention be defined by the claims appended hereto.

What is claimed is:

1. A method for preparing a ceramic component for brazing, comprising, in the order presented:
    a) providing the ceramic component;
    b) depositing a first coating of a silicon-bearing oxide material on the ceramic component;
    c) depositing, on to the first coating, a second coating comprising at least one active metal;
    d) depositing, on to the second coating, a third coating comprising at least one non-active metal; and
    e) firing the coated ceramic component in a non-oxidizing environment, whereby the ceramic component becomes prepared for brazing.

2. The method of claim 1, wherein the silicon-bearing oxide material is silicon dioxide or mullite.

3. The method of claim 1, wherein the active metal is selected from vanadium, titanium, chromium, zirconium, hafnium, niobium, or tantalum; or combinations thereof.

4. The method of claim 3, wherein the active metal is vanadium.

5. The method of claim 1, wherein the non-active metal is selected from gold, copper, nickel, silver, palladium, indium, or molybdenum; or combinations thereof.

6. The method of claim 5, wherein the non-active metal is gold.

7. The method of claim 1, wherein the firing step comprises heating to a temperature greater than about 1000 C.

8. The method of claim 1, wherein the firing step comprises heating to a temperature greater than about 1300 C.

9. The method of claim 1, wherein the firing step comprises heating to a temperature greater than the liquidus temperature of the non-active metal.

10. The method of claim 1, wherein the firing step comprises heating to a temperature and time sufficient to form a compound comprising aluminum, vanadium, and oxygen.

11. The method of claim 3, wherein the active metal is titanium, and the firing step comprises heating in an environment having essentially no hydrogen gas.

12. The method of claim 1, wherein the ceramic component comprises a material selected from alumina, sapphire, silicon carbide, silicon nitride, sialon, mullite, aluminum nitride, zirconia, partially stabilized zirconia, and beryllium oxide; or combinations thereof.

13. The method of claim 12, wherein the alumina material comprises greater than 94% aluminum oxide, by weight percentage.

14. The method of claim 13, wherein the alumina comprises greater than 99% aluminum oxide, by weight percentage.

15. The method of claim 1, wherein the first coating has a thickness of between about 25 angstroms and 2500 angstroms.

16. The method of claim 1, wherein at least one coating is deposited by physical vapor deposition.

17. A method for preparing a ceramic component for brazing, comprising, in the order presented:
    a) providing the ceramic component;
    b) depositing a first coating of a silicon-bearing oxide material on the ceramic component;
    c) co-depositing, on to the first coating, a second coating comprising a mixture of at least one active metal and at least one non-active metal; and
    d) firing the coated ceramic component in a non-oxidizing environment, whereby the ceramic component becomes prepared for brazing.

18. The method of claim 17, wherein the second coating comprises 0.5–0.6% of vanadium active metal, by weight percentage.

19. The method of claim 18, wherein the second coating comprises a gold-based alloy comprising about 81.6% gold, 16% nickel, 0.7% molybdenum, and 1.7% vanadium, by weight percentage.

20. The method of claim 19, wherein the firing step comprises holding at 1000 C. for about 5 minutes in a dry hydrogen atmosphere.

21. The method of claim 20, wherein the firing step further comprises soaking at 925 C. for about 10 minutes, prior to holding at 1000 C. for about 5 minutes.

22. A method for coating a ceramic component, comprising:
    a) providing a ceramic component;
    b) coating the ceramic component with a silicon-bearing oxide material;
    c) coating the ceramic component with at least one active metal;
    d) coating the ceramic component with at least one non-active metal; and
    e) firing the coated ceramic component in a non-oxidizing environment;
    wherein step c) is performed after step b); and
    wherein step d) is performed after step b).

* * * * *